United States Patent
Wang

(10) Patent No.: US 10,048,023 B2
(45) Date of Patent: Aug. 14, 2018

(54) HEAT EXCHANGER SHROUD MOUNT

(71) Applicants: DENSO International America, Inc., Southfield, MI (US); DENSO CORPORATION, Kariya-shi, Aichi-ken (JP)

(72) Inventor: Xinhua Wang, West Bloomfield, MI (US)

(73) Assignees: DENSO International America, Inc., Southfield, MI (US); DENSO CORPORATION, Kariya, Aichi-pref. (JP)

(*) Notice: Subject to any disclaimer, the term of this patent is extended or adjusted under 35 U.S.C. 154(b) by 131 days.

(21) Appl. No.: 14/837,838

(22) Filed: Aug. 27, 2015

(65) Prior Publication Data

US 2017/0059257 A1    Mar. 2, 2017

(51) Int. Cl.
| | |
|---|---|
| F28F 7/00 | (2006.01) |
| F28F 9/00 | (2006.01) |
| F28D 1/00 | (2006.01) |
| F28F 9/007 | (2006.01) |
| B60K 11/04 | (2006.01) |

(52) U.S. Cl.
CPC .............. *F28F 9/007* (2013.01); *B60K 11/04* (2013.01); *F28F 9/002* (2013.01)

(58) Field of Classification Search
CPC ...... F28F 9/001; F28F 9/002; F28F 2009/004; F28F 9/007; F28F 2280/00; F28F 2280/04; Y10T 403/453; Y10T 403/454; Y10T 403/33; Y10T 403/335; B60K 11/08

USPC ................. 165/67, 69, 149; 180/68.4, 68.6
See application file for complete search history.

(56) References Cited

U.S. PATENT DOCUMENTS

| | | | | |
|---|---|---|---|---|
| 2,576,316 A | * | 11/1951 | Toth ................. | B60K 11/04 180/68.4 |
| 2,774,620 A | * | 12/1956 | Thiry ............... | F16C 11/04 403/224 |
| 3,014,563 A | * | 12/1961 | Bratton ........... | F16B 5/0258 403/167 |
| 6,098,702 A | * | 8/2000 | Shadbourne ... | B60K 11/04 165/67 |
| 6,158,500 A | * | 12/2000 | Heine .............. | B60K 11/04 165/140 |
| 6,550,558 B2 | * | 4/2003 | Yorwarth ......... | B60K 11/04 16/2.1 |
| 2002/0003034 A1 | * | 1/2002 | Fukuoka ........ | F28F 9/002 165/67 |

(Continued)

*Primary Examiner* — Jason Thompson
(74) *Attorney, Agent, or Firm* — Harness, Dickey & Pierce, P.L.C.

(57) ABSTRACT

The present teachings provide for a heat exchanger assembly including a shroud, a heat exchanger, a pin, and a bead. The shroud can include a body and a first mount. The body can define a first aperture and a second aperture that can be fluidly coupled to the first aperture. The first mount can define a first surface. The heat exchanger can include a platform that can define a second surface. The pin can be fixedly coupled to and extend outwardly from one of the first or second surfaces and can be received in an aperture that is defined by the other of the first or second surfaces. The bead can be fixedly coupled to and extend from one of the first or second surfaces. The bead can be disposed about the aperture and compressed between the first and second surfaces.

5 Claims, 3 Drawing Sheets

(56) References Cited

U.S. PATENT DOCUMENTS

| | | | |
|---|---|---|---|
| 2002/0090297 A1* | 7/2002 | Kobayashi | F04D 29/582 |
| | | | 415/220 |
| 2004/0200598 A1 | 10/2004 | Hitt et al. | |
| 2005/0121170 A1* | 6/2005 | Maeda | F28D 1/0435 |
| | | | 165/67 |
| 2006/0213639 A1* | 9/2006 | Kobayashi | B60K 11/04 |
| | | | 165/67 |
| 2010/0189493 A1* | 7/2010 | Aldstadt | F16B 43/001 |
| | | | 403/168 |

* cited by examiner

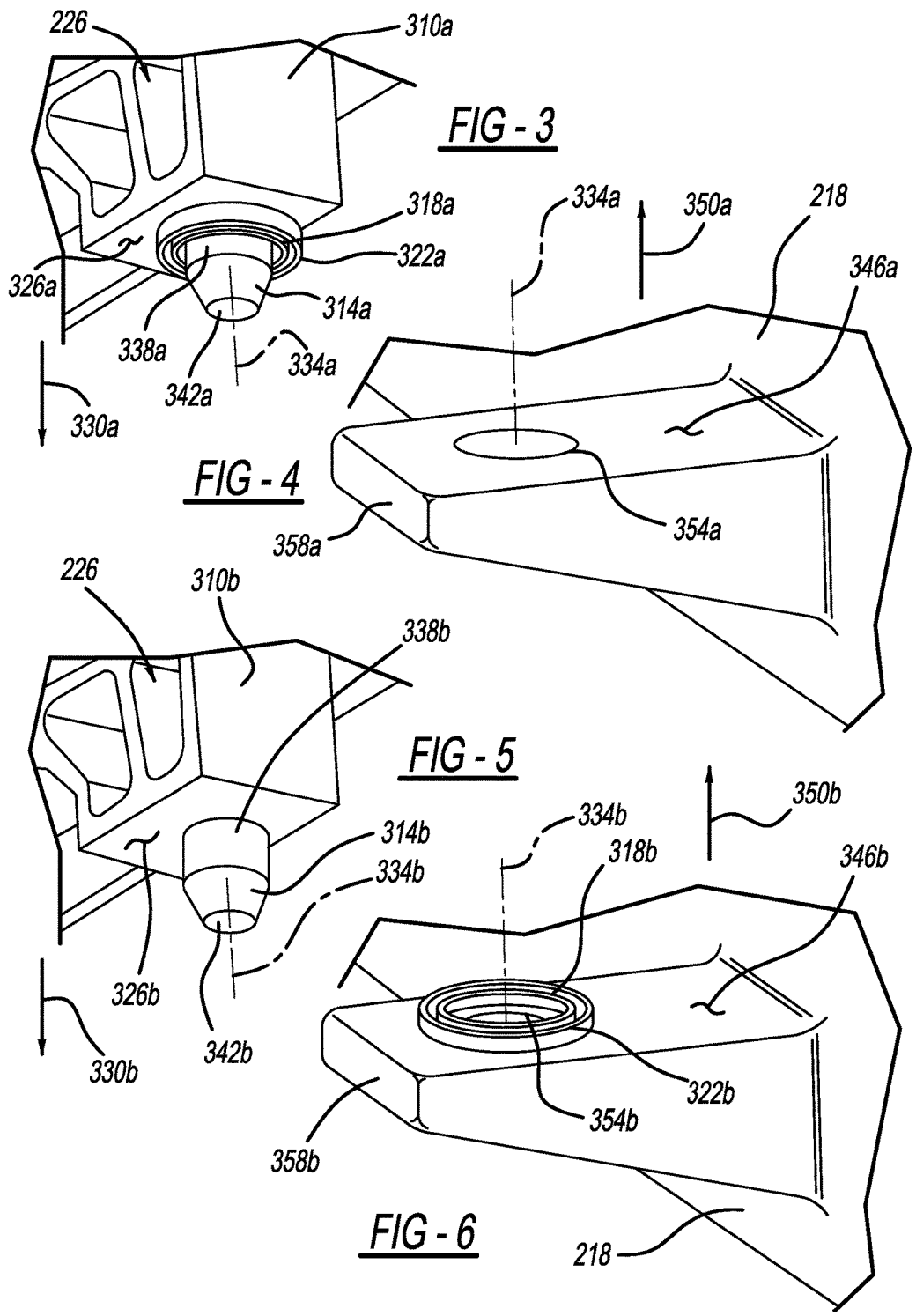

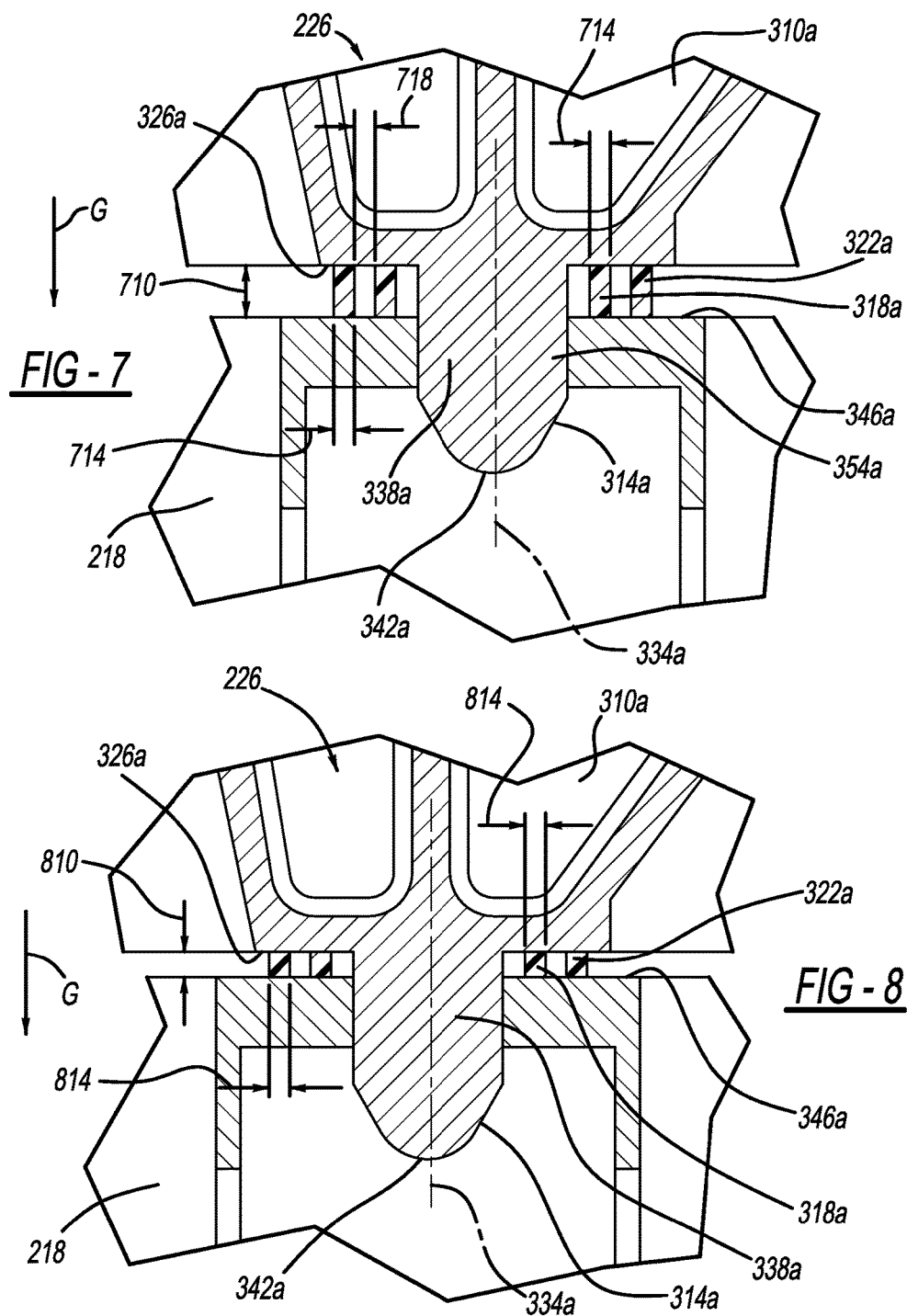

HEAT EXCHANGER SHROUD MOUNT

FIELD

The present disclosure relates to heat exchanger shroud mounts.

BACKGROUND

This section provides background information related to the present disclosure which is not necessarily prior art.

Vehicles that have an internal combustion engine typically have coolant system (e.g. an engine coolant system or transmission coolant system) that removes heat from the one component (e.g. engine or transmission) and expels it into the atmosphere about the vehicle. The coolant system generally includes a heat exchanger and a fan assembly mounted to the heat exchanger to blow or draw air across the heat exchanger. The fan assembly generally includes a shroud mounted to the heat exchanger and a fan mounted to the shroud such that the shroud funnels air from areas of the heat exchanger that are not directly in-line with the fan. In this way, the shroud generally aids more even airflow across the entire surface area of the heat exchanger. Typically the shroud is mounted to the heat exchanger by a plurality of fasteners, which can increase the number of parts and assembly time, which can raise manufacturing costs. Furthermore, tight tolerances are typically required at the mounting points to prevent noise, vibration, and wear at the mounting points.

SUMMARY

This section provides a general summary of the disclosure, and is not a comprehensive disclosure of its full scope or all of its features.

The present teachings provide for a heat exchanger assembly including a heat exchanger shroud mount.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 3 is a perspective view of a portion of a shroud of the heat exchanger assembly of FIG. 2;

FIG. 4 is a perspective view of a portion of the heat exchanger assembly of FIG. 2;

FIG. 5 is a perspective view similar to FIG. 3, illustrating a portion of a shroud of a second construction;

FIG. 6 is a perspective view similar to FIG. 4, illustrating a portion of a heat exchanger of a second construction;

FIG. 7 is a plan view of a portion of the heat exchanger assembly of FIG. 2, illustrating a mount in a first position; and FIG. 8 is a plan view similar to FIG. 7, illustrating the mount in a second position.

Corresponding reference numerals indicate corresponding parts throughout the several views of the drawings.

DETAILED DESCRIPTION

Example embodiments will now be described more fully with reference to the accompanying drawings.

The present teachings are directed to a heat exchanger shroud and mount that eliminates the gap between the shroud and the mount and inhibits dirt and debris from entering between the shroud and the mount.

Figure 1:
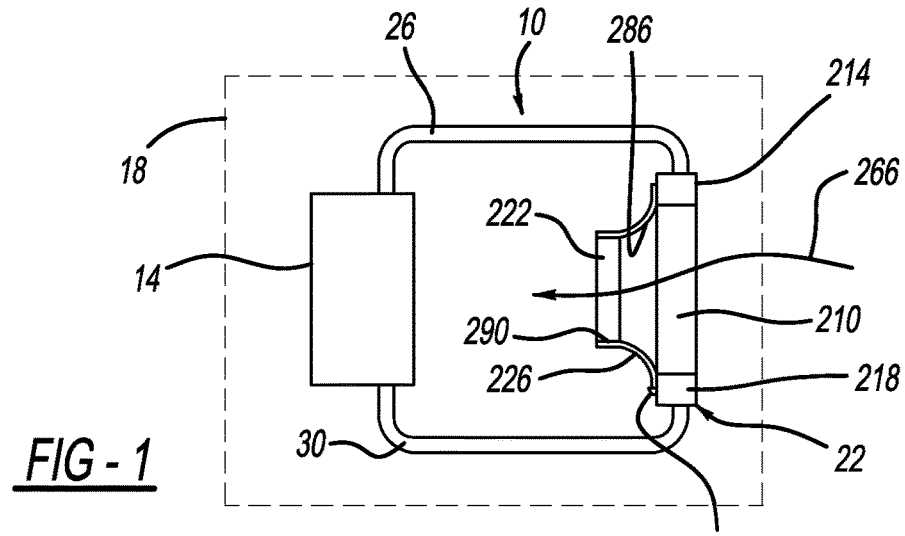
FIG. 1 is a schematic view of a vehicle, illustrating a cooling system in accordance with the present teachings.

With reference to FIG. 1, an example of a cooling system 10 is schematically illustrated. In the example provided, the cooling system 10 cools an engine 14 of a vehicle 18, though it is understood that the cooling system 10 can be configured for other applications. For example, the cooling system 10 can be used for applications besides vehicles (e.g. machinery, generators, agricultural or military equipment), or can be used for applications besides cooling an engine (e.g. transmission cooling, oil cooling, cooling electronics or electric motors). The cooling system 10 can include a heat exchanger assembly 22, a first conduit 26, and a second conduit 30. In the example provided, the first conduit 26 is a supply conduit and the second conduit 30 is a return conduit, though other configurations can be used. While a single supply conduit and a single return conduit are illustrated, additional conduits (not shown) can be used.

Figure 2:
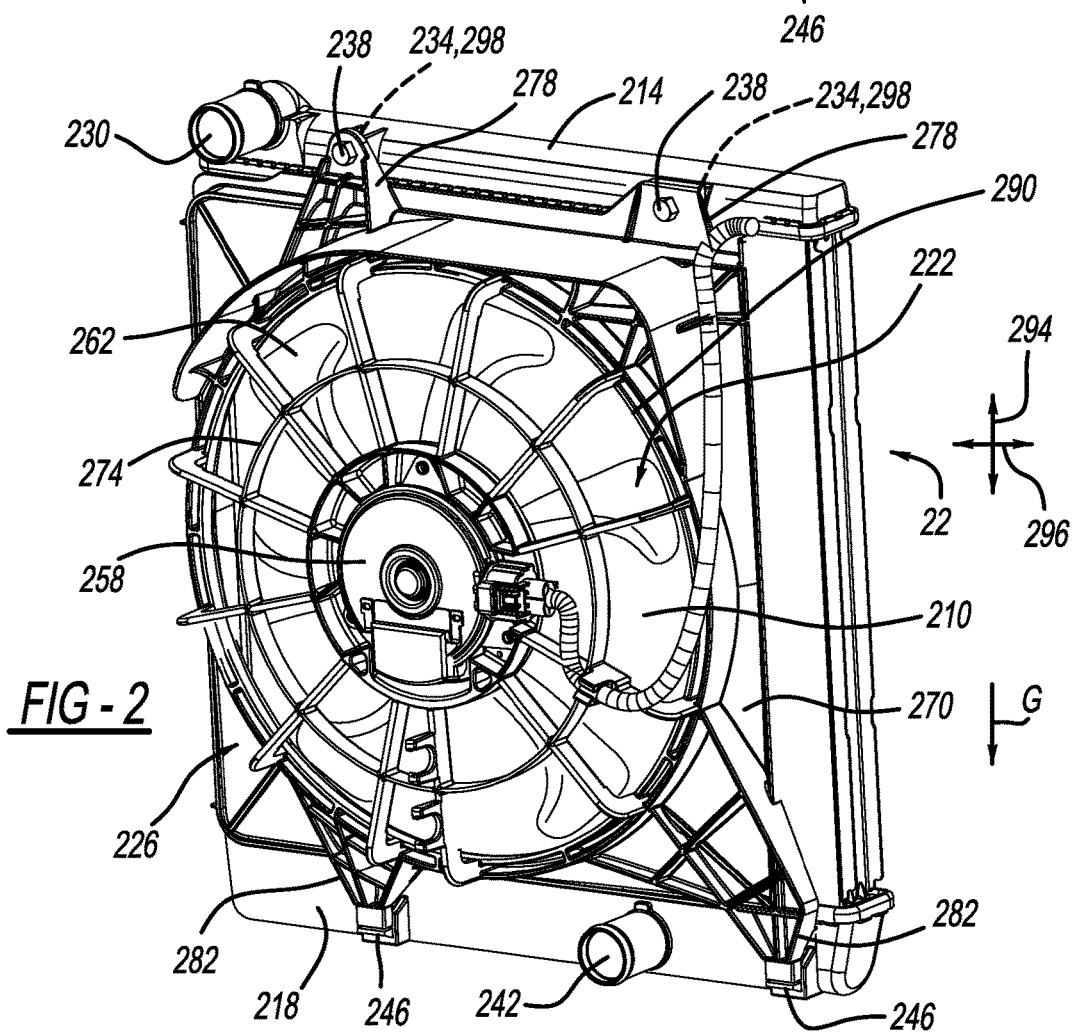
FIG. 2 is a plan view of a heat exchanger assembly of the cooling system of FIG. 1.

With additional reference to FIG. 2, the heat exchanger assembly 22 can include a heat exchanger core 210, a first tank 214, a second tank 218, a fan 222, and a shroud 226. The heat exchanger core 210, first tank 214, and second tank 218 can generally be constructed in any suitable manner. In the example provided, the first tank 214 is a generally hollow body that includes a first port 230 and a pair of upper mounting apertures 234. The first port 230 can be coupled to the first conduit 26 to fluidly couple the first conduit 26 with the interior of the first tank 214. The pair of upper mounting apertures 234 can be internally threaded and configured to receive a pair of threaded fasteners 238 therein to couple the shroud 226 to the first tank 214.

In the example provided, the second tank 218 is a generally hollow body that includes a second port 242 and a pair of lower platforms 246. The second port 242 can be coupled to the second conduit 30 to fluidly couple the second conduit 30 with the interior of the second tank 218. The lower platforms 246 are described in greater detail below.

In the example provided, the heat exchanger core 210 includes a plurality of tubes that extend between the first tank 214 and the second tank 218 to fluidly couple the interiors of the first and second tanks 214, 218. Thus, liquid coolant fluid (e.g. ethylene glycol or water) can flow from the first conduit 26 to the first tank 214, then through the tubes to the second tank 218 and out the second conduit 30. A plurality of fins can be fixedly coupled to the outside of the tubes and can extend generally between the tubes in a conventional manner. In the example provided, the heat exchanger core 210 is a generally rectangular shape, though other configurations can be used.

The fan 222 can be any suitable type of fan. In the example provided, the fan 222 is an electric fan, including a motor 258 and a plurality of fan blades 262. The motor 258 can be mounted to the shroud 226 and configured to rotate the fan blades 262 relative to the shroud 226 about a rotational axis of the motor 258 that can be perpendicular to the tubes. The fan blades 262 can be disposed between the shroud and the tubes and configured to either draw or blow air through the heat exchanger core (i.e. between the tubes).

In the example provided, the fan blades 262 are configured to draw air through the heat exchanger core 210 as indicated by arrow 266 shown in FIG. 1.

The shroud 226 can include a funnel body 270, a motor mount 274, a pair of upper mounts 278, and a pair of lower mounts 282. In the example provided, the funnel body 270, motor mount 274, upper mounts 278, and lower mounts 282 are unitarily formed of a single, molded polymer material, though other configurations can be used. The funnel body 270 can define a first aperture 286 and a second aperture 290 spaced apart from the first aperture.

The first aperture 286 can be proximate to the heat exchanger core 210 and the second aperture 290 can be distal to the heat exchanger core 210. The first aperture 286 can have a generally rectangular shaped flow area that can span the heat exchanger core 210 between the first and second tanks 214, 218. In the example provided, the first aperture 286 spans the heat exchanger core 210 in both a vertical direction 294 and a horizontal direction 296, though other configurations can be used. In the example provided, the vertical direction can correspond to the orientation of the heat exchanger assembly 22 in the vehicle 18, such that when the vehicle 18 is on a level surface, gravity acts in the vertical direction 294 to pull objects in the direction indicated by arrow G.

The second aperture 290 can have a generally circular shape approximately the diameter of the fan blades 262. The second aperture 290 can have a flow area that is smaller than the flow area of the first aperture 286. The funnel body 270 can have a generally funnel shape such that the funnel body 270 tapers from the larger first aperture 286 to the smaller second aperture 290.

The motor mount 274 can be fixedly coupled to the funnel body 270 proximate to the second aperture 290. The motor mount 274 can be coupled to the motor 258 to support the fan 222 coaxially with the second aperture 290. In the example provided, the fan blades 262 are disposed axially between the first and second apertures 286, 290.

In an alternative construction, not specifically shown, the heat exchanger core 210 can be longer than it is high (i.e. longer in the horizontal direction 296 than in the vertical direction 294). In such a construction, the first aperture 286 can span only partially across the heat exchanger core 210 in the horizontal direction 296 and one or more additional shrouds (not shown) can span the remaining horizontal length of the heat exchanger core 210.

In another alternative construction, not specifically shown, the funnel body 270 can define additional apertures that can be similar to the first and second apertures 286, 290 and adjacent to the first and second apertures 286, 290. In such a construction, the shroud 226 can include additional motor mounts and fans similar to the motor mount 274 and fan 222 and configured to blow/draw air through the additional apertures.

The upper mounts 278 can be fixedly coupled to the funnel body 270 and can extend outwardly therefrom. The upper mounts 278 can each define an upper mount aperture 298. The upper mount aperture 298 can be configured to receive one of the threaded fasteners such that the fastener 238 can fixedly couple the upper mount 278 to the first tank 214. The lower mounts 282 can generally be coupled to and supported by the lower platforms 246 as described below.

With additional reference to FIGS. 3 and 4, a first construction of the lower mounts 282 and lower platforms 246 is illustrated. The lower mounts and lower platforms of this construction are respectively indicated by reference numerals 282a and 246a. The lower mount 282a can include a block 310a, a pin 314a, and a first bead 318a. In the example provided, the lower mount 282a includes a second bead 322a, though more or fewer beads can be used.

The block 310a can have a first surface 326a that can be flat and face away from the funnel body 270 (FIG. 2) in direction 330a, which can correspond to the direction G shown in FIG. 2. Pin 314a can extend outward from the first surface 326a and along axis 334a which can be generally perpendicular to the first surface 326a such that pin 314a extends in direction 330a. In the example provided, pin 314a is a generally cylindrical shape having a cylindrical body portion 338a and a free end 342a that is tapered to narrow from the body portion 338a. While illustrated as having a cylindrical shape, pin 314a can be other suitable shapes.

The first bead 318a can extend outward from the first surface 326a in the direction 330a. The first bead 318a can be disposed about the entire perimeter of the pin 314a to surround the pin 314a proximate to the first surface 326a. The first bead 318a can extend in the direction 330a less than the length of the pin 314a. In the example provided, the first bead 318a is an annular shape that is coaxial with the pin 314a and has an inner diameter that is greater than the outer diameter of the pin 314a, though other configurations that entirely surround the pin 314a can be used (e.g. polygonal or irregular shapes). The second bead 322a can be coaxial with the first bead 318a and can be similar to the first bead 318a except the second bead 322a can be disposed radially outward of the first bead 318a (i.e. the inner diameter of the second bead 322a is greater than the outer diameter of the first bead 318a).

The lower platform 246a can be fixedly coupled to the second tank 218 and can extend outward therefrom. The lower platform 246a can define a second surface 346a that can be flat and face toward the funnel body 270 (FIG. 2) in direction 350a, which can be the opposite of direction 330a. In other words, the second surface 346a can oppose the first surface 326a. The lower platform 246a can define a lower mounting aperture 354a that is coaxial with the pin 314a. The lower mounting aperture 354a can have a diameter that is approximately equal to or slightly larger than the pin 314a such that the pin 314a can be received in the lower mounting aperture 354a. In the example provided, the lower platform 246a is a wedge shape, being wider proximate to the second tank 218 and narrowing toward a free end 358a, though other configurations can be used.

With additional reference to FIGS. 5 and 6, a second construction of the lower mounts 282 and lower platforms 246 is illustrated. The lower mounts and lower platforms of this construction are respectively indicated by reference numerals 282b and 246b. The lower mount 282b and lower platform 246b can be similar to lower mount 282a and lower platform 246a respectively, except as shown or described below. Accordingly similar reference numerals refer to similar elements and only the differences will be described in detail herein.

In the construction shown in FIGS. 5 and 6, the lower mount 282b does not include the first or second beads 318a, 322a. Instead, the lower platform 246b includes a first bead 318b and a second bead 322b. The first and second beads 318b, 322b can be similar to the first and second beads 318a, 322a except that the first and second beads 318b, 322b extend outward from the second surface 346b in direction 350b. The first bead 318b can be disposed about the entire perimeter of the lower mounting aperture 354b to surround the lower mounting aperture 354b proximate to the second surface 346b. The first bead 318b can extend in the direction 350b less than the length of the pin 314b. In the example provided, the first bead 318b is an annular shape that is coaxial with the lower mounting aperture 354b and has an inner diameter that is greater than the diameter of the lower mounting aperture 354b, though other configurations that entirely surround the lower mounting aperture 354b can be used (e.g. polygonal or irregular shapes). The second bead 322b can be coaxial with the first bead 318b and can be similar to the first bead 318b except the second bead 322b can be disposed radially outward of the first bead 318b (i.e. the inner diameter of the second bead 322b is greater than the outer diameter of the first bead 318b).

In an alternative construction, not specifically shown, at least one bead (e.g. bead 318a or 322a) can be formed on the first surface 326a and at least one bead (e.g. bead 322b or 318b) can be formed on the second surface 346a. In such a configuration, the beads on the first and second surfaces 326a, 346a can be radially offset from one another, such that the bead on the first surface 326a does not align with or contact the bead on the second surface 346a when the pin 314a is received in the lower mounting aperture 354a as described below.

In an alternative construction, not specifically shown, the pin 314a can be fixedly coupled to the second surface 346a and can extend upwards therefrom. In such a construction, the mounting aperture 354a can be defined by the first surface 326a and can receive the pin 314a therein.

With additional reference to FIGS. 7 and 8, a sectional view of the lower mount 282a and the lower platform 246a are illustrated. FIG. 7 illustrates the lower mount 282a in a preset position relative to the lower platform 246a, while FIG. 8 illustrates the lower mount 282a in a full-set position. When mounting the shroud 226 to the first and second tanks 214, 218, the pins 314a are first inserted into the corresponding lower mounting apertures 354a such that the first and second surfaces 326a, 346a oppose each other and the lower mount 282a is positioned in the preset position.

In the preset position, the first and second beads 318a, 322a abut or contact the second surface 346a and are not compressed such that they have a height 710 and a width 714. In the example provided, the height 710 can be approximately 1.5 mm-4.5 mm and the width can be approximately 0.5 mm-2 mm, though other heights or widths can be used depending on the application. The first and second beads 318a, 322a are spaced apart by a distance 718. In other words, the outer radius of the first bead 318a is less than the inner radius of the second bead 322a by an amount equal to the distance 718. The inner radius of the first bead 318a is greater than the radius of the lower mounting aperture 354a.

The fasteners 238 (FIG. 2) can then be inserted into the upper mounting apertures 234 (FIG. 2) to fixedly couple the upper mounts 278 to the first tank 214. The height 710 of the first and second beads 318a, 322a can be greater than the maximum distance between the first and second surfaces 326a, 346a when considering tolerance stacking. For example, the designed distance between the first and second surfaces 326a, 346a can be 0 mm, but due to tolerances, the actual maximum distance between the first and second surfaces 326a, 346a can be greater than 0 mm, and the height 710 can be greater than this actual maximum distance. Accordingly, the shroud 226 can be pressed down in the direction G to compress the beads 318a, 322a and permit the fasteners 238 (FIG. 2) to be inserted into the upper mounting apertures 234 (FIG. 2). Gravity can act on the fan 222 and shroud 226 such that the weight of the fan 222 and shroud 226 cause the lower mount 282a to move in the direction G to the full-set position.

In the full-set position, the first and second surfaces 326a, 346a are closer together than in the preset position, such that the first and second beads 318a, 322a are compressed. While compressed, the first and second beads 318a, 322a have a height 810 and a width 814. The height 810 can be less than the height 710. In the example provided, the height 810 can be approximately 0.5 mm-2.5 mm, though other heights can result depending on the application and the height 710. The first and second beads 318a, 322a can be generally squished or deformed such that the width 814 above the first surface 326a can be greater than the width 714. Since the first and second beads 318a, 322a are compressed in the full-set position, the first and second beads 318a, 322a can maintain constant contact with the second surface 346a even when the heat exchanger assembly 22 vibrates, or parts of the heat exchanger assembly 22 expand or contract due to temperature changes.

In the example provided, the beads 318a, 322a are integrally formed with the block 310a to be a single, molded polymer material (e.g. nylon), though other configurations can be used. For example, the beads 318a, 322a can be separately added to the block 310a after formation of the block 310a (e.g. by an adhesive or plastic welding). For example, the shroud 226, including the blocks 310a can be formed of a polymer material in a molding process (e.g. injection molding). In order to remove the shroud 226 from the molding dies (not shown), the first surface 326a generally can have a draft angle such that the first surface 326a is not parallel to the second surface 346a. Furthermore, tolerances, imperfections, and warping due to thermal expansion/contraction, can also result in the first surface 326a not being perfectly parallel to the second surface 346a after the initial molding of the block 310a.

When the first and second surfaces 326a, 346a are not parallel, dirt and debris can get in between the first and second surfaces 326a, 346a and between the pin 314a and the lower mounting aperture 354a, which can cause wear. Additionally, vibration of the lower mount 282a and the lower platform 246 can result in undesirable noise. Thus, the beads 318a, 322a can be added to the first surface 326a after the formation of the block 310a. In such a configuration, the beads 318a, 322a can also be formed of a different material than the block 310a if desired.

Operation of the beads 318b, 322b can be similar to that of the beads 318a, 322a, except that the beads 318b, 322b are fixedly coupled to the second surface 346b instead of the first surface 326b as described above. Similarly, the beads 318b, 322b can be integrally formed with the lower platform 246b or can be separately added to the second surface 346b after formation of the lower platform 246b (e.g. by an adhesive or plastic welding).

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A heat exchanger assembly comprising:
    a shroud including a body and a first mount, the body defining a first aperture and a second aperture that is fluidly coupled to the first aperture, the first mount defining a first surface;
    a heat exchanger including a platform, the platform defining a second surface;
    a pin fixedly coupled to and extending outward from one of the first surface or the second surface, in an assembled state the pin is received in a mount aperture that is defined by the other one of the first surface or the second surface;
    a first bead fixedly coupled to and extending from one of the first surface or the second surface in a disassembled state in which the pin is not received within the mount aperture, the first bead being disposed about the mount aperture and compressed between the first and second surfaces in the assembled state; and
    a second bead disposed about the first bead, the second bead being fixedly coupled to and extending outwardly from the one of the first surface or the second surface that the first bead is coupled to in the disassembled state, the second bead being compressed between the first and second surfaces in the assembled state, wherein a space is defined between the first bead and the second bead
    a fan including a plurality of fan blades and a motor configured to rotate the fan blades about a rotational axis of the motor, the motor being fixedly coupled to the shroud;
    wherein the heat exchanger includes a core and a tank, wherein the platform is fixedly coupled to the tank and extends outwardly therefrom; and
    wherein the fan is disposed above the platform and a weight of the fan and the body of the shroud is configured to compress the first bead between the first and second surfaces in the assembled state.

2. The heat exchanger assembly of claim 1, wherein the pin is a cylindrical shape and the mount aperture is a circular shape.

3. The heat exchanger assembly of claim 1, wherein the first bead is fixedly coupled to the first surface and extends outwardly therefrom in the disassembled state, and abuts the second surface in the assembled state.

4. The heat exchanger assembly of claim 1, wherein the first bead is fixedly coupled to the second surface and extends outwardly therefrom in the disassembled state, and abuts the first surface in the assembled state.

5. The heat exchanger assembly of claim 1, wherein the first bead is formed of a polymer material.

* * * * *